US011086471B2

(12) United States Patent
Pascale et al.

(10) Patent No.: US 11,086,471 B2
(45) Date of Patent: Aug. 10, 2021

(54) VISUALIZING NEURAL NETWORKS

(71) Applicant: salesforce.com, inc., San Francisco, CA (US)

(72) Inventors: Greg Thomas Pascale, Seattle, WA (US); Zachary Alexander, Snoqualmie, WA (US); Scott Thurston Rickard, Jr., Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 903 days.

(21) Appl. No.: 15/608,618

(22) Filed: May 30, 2017

(65) Prior Publication Data

US 2017/0351401 A1 Dec. 7, 2017

Related U.S. Application Data

(60) Provisional application No. 62/346,373, filed on Jun. 6, 2016.

(51) Int. Cl.
*G06F 3/0481* (2013.01)
*G06F 16/34* (2019.01)
(Continued)

(52) U.S. Cl.
CPC ........ *G06F 3/04812* (2013.01); *G06F 16/248* (2019.01); *G06F 16/34* (2019.01);
(Continued)

(58) Field of Classification Search
CPC .... G06F 3/04812; G06F 16/34; G06F 16/248; G06F 17/30554; G06F 17/30716;
(Continued)

(56) References Cited

U.S. PATENT DOCUMENTS

| | | | | |
|---|---|---|---|---|
| 5,222,210 A | * | 6/1993 | Leivian | G06N 3/105 |
| | | | | 715/854 |
| 6,049,793 A | * | 4/2000 | Tomita | G06K 9/6253 |
| | | | | 706/17 |

(Continued)

FOREIGN PATENT DOCUMENTS

GB 2231760 A * 11/1990 ......... G06F 3/04897

OTHER PUBLICATIONS

Liu et al., "Towards Better Analysis of Deep Convolutional Neural Networks" May 4, 2016. (Year: 2016).*

(Continued)

*Primary Examiner* — Miranda M Huang
*Assistant Examiner* — Chase P. Hinckley
(74) *Attorney, Agent, or Firm* — Fenwick & West LLP

(57) ABSTRACT

A user provides a description of a neural network to a visualization tool. The visualization tool displays a user interface that includes a visual of the neural network based on the description. If the user interacts with a node or connection, for example by placing a cursor on the node/connection in the user interface, the user interface displays information associated with the node/connection. If the user selects a node of a layer, the neural network is applied to an input that corresponds to the selection and the user interface displays the propagation of the input through the neural network. Additionally, the user interface displays results from applying the neural network to the input.

20 Claims, 19 Drawing Sheets

(51) Int. Cl.
*G06F 16/248* (2019.01)
*G06N 3/10* (2006.01)
*G06T 11/20* (2006.01)
*G06N 20/00* (2019.01)

(52) U.S. Cl.
CPC ............. *G06N 3/105* (2013.01); *G06N 20/00* (2019.01); *G06T 11/206* (2013.01)

(58) Field of Classification Search
CPC ........ G06N 3/063; G06N 3/105; G06N 20/00; G06T 11/206
USPC .......................................................... 706/15
See application file for complete search history.

(56) References Cited

U.S. PATENT DOCUMENTS

| | | | | |
|---|---|---|---|---|
| 7,475,072 | B1* | 1/2009 | Ershov | G06F 16/9535 |
| 10,078,634 | B2* | 9/2018 | Gou | G06F 40/205 |
| 10,664,766 | B2* | 5/2020 | Hammond | G06F 8/311 |
| 10,810,491 | B1* | 10/2020 | Xia | G06N 3/08 |
| 2002/0105552 | A1* | 8/2002 | Lane | G06T 11/206 |
| | | | | 715/853 |
| 2005/0120030 | A1* | 6/2005 | Varpela | H04L 41/12 |
| 2006/0224533 | A1* | 10/2006 | Thaler | G06N 3/0454 |
| | | | | 706/15 |
| 2007/0094168 | A1* | 4/2007 | Ayala | G06N 3/105 |
| | | | | 706/15 |
| 2011/0261049 | A1* | 10/2011 | Cardno | G06Q 10/10 |
| | | | | 345/419 |
| 2012/0158623 | A1* | 6/2012 | Bilenko | G06N 20/00 |
| | | | | 706/12 |
| 2012/0162230 | A1* | 6/2012 | Nevin, III | G06F 16/2425 |
| | | | | 345/440 |
| 2013/0232433 | A1* | 9/2013 | Krajec | G06F 11/323 |
| | | | | 715/771 |
| 2013/0239006 | A1* | 9/2013 | Tolkachev | G06N 3/10 |
| | | | | 715/738 |
| 2013/0282889 | A1* | 10/2013 | Tito | G06Q 50/01 |
| | | | | 709/224 |
| 2014/0253556 | A1* | 9/2014 | Riche | G06T 11/206 |
| | | | | 345/440 |
| 2014/0354650 | A1* | 12/2014 | Singh | G06F 8/34 |
| | | | | 345/440 |
| 2015/0026100 | A1* | 1/2015 | Kudritskiy | G06N 3/08 |
| | | | | 706/11 |
| 2015/0106306 | A1* | 4/2015 | Birdwell | G06N 3/10 |
| | | | | 706/11 |
| 2015/0242761 | A1* | 8/2015 | Amershi | G06K 9/00536 |
| | | | | 706/11 |
| 2015/0379394 | A1* | 12/2015 | Thaler | G06N 3/0454 |
| | | | | 706/20 |
| 2016/0018962 | A1* | 1/2016 | Low | G06F 3/0481 |
| | | | | 715/771 |
| 2016/0350644 | A1* | 12/2016 | Devarajan | G06N 3/084 |
| 2017/0083814 | A1* | 3/2017 | Keahey | G06N 3/126 |
| 2017/0213132 | A1* | 7/2017 | Hammond | G06N 3/08 |
| 2018/0018553 | A1* | 1/2018 | Bach | G06K 9/6247 |
| 2018/0357152 | A1* | 12/2018 | Browne | G06F 11/3692 |
| 2020/0250583 | A1* | 8/2020 | Hammond | G06N 20/00 |

OTHER PUBLICATIONS

Harley, Adam W., "An Interactive Node-Link Visualization of Convolutional Neural Networks" 2015, pp. 867-877. (Year: 2015).*
Streeter et al., "NVIS: An interactive visualization tool for neural networks" 2001, pp. 234-241. (Year: 2001).*
Wejchert et al., "Visualizing processes in neural networks" 1991, pp. 244-253. (Year: 1991).*
Tzeng et al., "Opening the Black Box—Data Driven Visualization of Neural Networks" 2005, IEEE, pp. 383-390. (Year: 2005).*
Tominski et al., "CGV—An interactive graph visualization system" 2009, Computers and Graphics, pp. 660-678. (Year: 2009).*
Kaskinki et al., "'SNN3DViewer'—A 3D Visualization Tool for Spiking Neural Network Analysis" 2008, pp. 469-476. (Year: 2008).*
Yosinki et al., "Understanding Neural Networks Through Deep Visualization" Jun. 22, 2015, pp. 1-12. (Year: 2015).*
Zintgraf et al., "A New Method to Visualize Deep Neural Networks" Mar. 8, 2016. (Year: 2016).*
Nguyen et al., "Multifaceted Feature Visualization: Uncovering the Different Types of Features Learned by Each Neuron in Deep Neural Networks" May 7, 2016. (Year: 2016).*
Yoshimi, Jeff, "Simbrain: A visual framework for neural network analysis and education" May 2008, pp. 1-26. (Year: 2008).*
Matlab, "Neural Network Toolbox 7" 2010, pp. 1-951. (Year: 2010).*
Karpathy, Andrej, "ConvNetJS: Deep Learning in your browser" 2014. (Year: 2014).*
Zeiler et al., "Visualizing and Understanding Convolutional Networks" Nov. 28, 2013. (Year: 2013).*
Xie et al., "InterActive: Inter-Layer Activeness Propagation" Apr. 30, 2016, pp. 1-10. (Year: 2016).*
Spanakis et al., "AMSOM: Adaptive Moving Self-organizing Map for Clustering and Visualization" May 19, 2016. (Year: 2016).*
Donahue et al., "DeCAF: A Deep Convolutional Activation Feature for Generic Visual Recognition" 2014 (Year: 2014).*
Ahmed et al., "A Web-based Interactive Visual Graph Analytics Platform" Feb. 2, 2015. (Year: 2015).*
Drouhard et al., "Visual Analytics for Neuroscience-Inspired Dynamic Architectures" Dec. 9-12, 2014, IEEE Symposium on Foundations of Computational Intelligence. (Year: 2014).*
Tensor Flow Playground, Apr. 13, 2016, screenshot internet sourced at http://playground.tensorflow.org/ (Year: 2016).*
Abadi et al., "TensorFlow: Large-Scale Machine Learning on Heterogeneous Distributed Systems" Mar. 16, 2016, pp. 1-19. (Year: 2016).*
Rossi et Ahmed, "An Interactive Data Repository with Visual Analytics" Feb. 25, 2016, pp. 37-41. (Year: 2016).*
Neto et al., "LODVader: An Interface to LOD Visualization, Analytics and DiscovERyin Real-time" Apr. 2016, pp. 163-166. (Year: 2016).*
Seufert et al., "Instant Espresso: Interactive Analysis of Relationships in Knowledge Graphs" Apr. 2016, pp. 251-254. (Year: 2016).*
Stolper et al., "GLO-STIX: Graph-Level Operations for Specifying Techniques and Interactive exploration" Dec. 2014, pp. 2320-2328. (Year: 2014).*

* cited by examiner

VISUALIZING NEURAL NETWORKS

CROSS-REFERENCE TO RELATED APPLICATION

This application claims the benefit of U.S. Provisional Application 62/346,373, filed Jun. 6, 2016, which is hereby incorporated by reference in its entirety.

BACKGROUND

Field of Art

The described embodiments pertain in general to neural networks, and in particular to visualizing neural networks.

Description of the Related Art

Neural networks (also referred to as artificial neural networks) are computational models that capture the relationships between different entities based on training data. A neural network can capture relationships that would be difficult or impossible for a user to capture. As a result neural networks are used to solve difficult problems. For example, a neural network can be used to determine which records are relevant to a search query entered by a user or which records are most likely to be of interest to the user that entered the query. As another example, a neural network can be used for facial recognition.

Because neural network are solving complicated problems, the neural networks themselves are complicated. As a result, it is difficult to understand a neural network and determine whether the neural network is operating as desired.

SUMMARY

The embodiments described herein provide methods, computer program products, and systems for displaying a visual of a neural network. A user provides a descriptions of a neural network to a visualization tool. The description includes, for example, information on the number of layers of the neural network, the dimensionality of each layer (e.g., number of nodes in each layer), data associated with each node (e.g., information on an entity represented by each node), the connections between nodes/layers, and the weight of each connection. The visualization tool displays a user interface that includes a visual of the neural network based on the description.

If the user interacts with a node or connection, for example by placing a cursor on the node/connection in the user interface, the user interface displays information associated with the node/connection. If the user selects a node of a layer, the neural network is applied to an input that corresponds to the selection and the user interface displays the propagation of the input through the neural network. Additionally, the user interface displays results from applying the neural network to the input.

The features and advantages described in the following detailed description are not all-inclusive. Many additional features and advantages will be apparent to one of ordinary skill in the art in view of the drawings, specification, and claims hereof.

Figure 1:
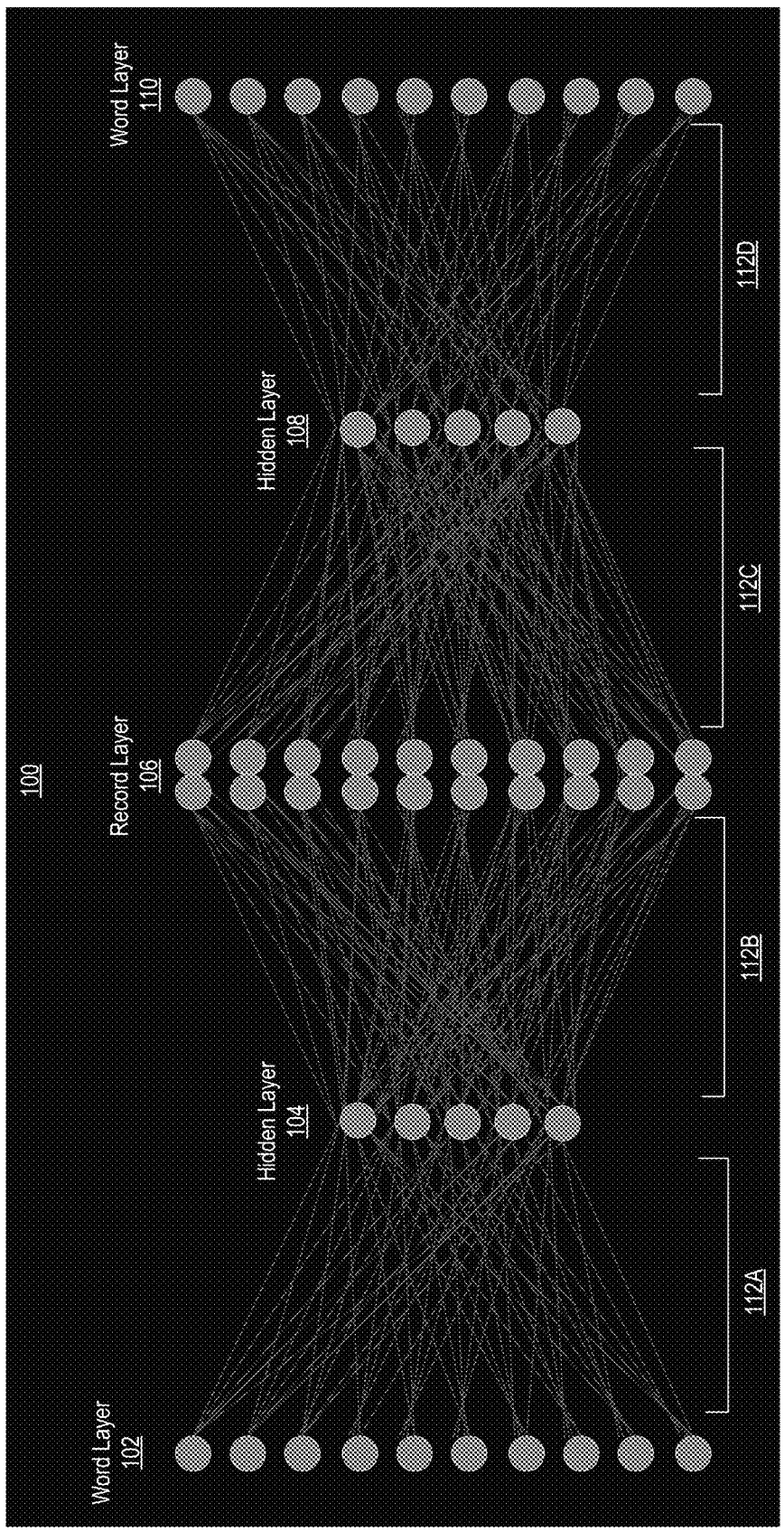
FIG. 1 illustrates a user interface displaying a neural network according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "802A," indicates that the text refers specifically to the element having that particular reference numeral. A reference numeral in the text without a following letter, such as "802," refers to any or all of the elements in the figures bearing that reference numeral.

DETAILED DESCRIPTION

Described herein is a visualization tool for the interactive exploration of the meaning and interconnectivity patterns in neural networks. The visualization tool receives a description of a neural network. The description includes one or more of the following: the number of layers of the network, the dimensionality of each layer (e.g., number of nodes/neurons in each layer), data associated with each node (e.g., information on an entity represented by each node), the connections between nodes/layers (e.g., nodes between two layers are fully connected) and the weight of each connection.

Based on the received description, the visualization tool causes a user interface to be displayed on a client device. The user interface includes a visual of the neural network. FIG. 1 provides an example of a user interface displayed with a neural network 100. The neural network 100 includes five layers: a word layer 102, a hidden layer 104, a record layer 106, a hidden layer 108, and a word layer 110. Each layer includes a number of nodes according to the dimensionality of the layer. For example, world layers 102 and 110 each include ten nodes, hidden layers 104 and 108 each include five nodes, and record layer 106 includes twenty nodes.

In one embodiment, the display of nodes in each layer are organized in a user interface with respect to the number of nodes in the layer. For example, in FIG. 1 the word layers 102 and 110 each display ten rows of nodes with one node per row. However, since record layer 106 includes twenty nodes, ten rows of nodes are displayed with two nodes per row. However, if a layer, for example, included 800 nodes, the user interface may display eighty rows of nodes with ten nodes per row.

The nodes of certain layers may represent specific entities. In the example of FIG. 1, the nodes of word layers 102 and 110 each represent a word. The nodes of record layer 106 each represent a different record, such as a document, an email, a web page, etc. However, the representations of nodes in the hidden layers 104 and 108 may be unknown.

The user interface also displays the connections between the layers. The user interface of FIG. 1 displays connections 112A between word layer 102 and hidden layer 104, connections 112B between hidden layer 104 and record layer 106, connections 112C between record layer 106 and hidden layer 108, and connections 112D between hidden layer 108 and word layer 110.

Figure 2:
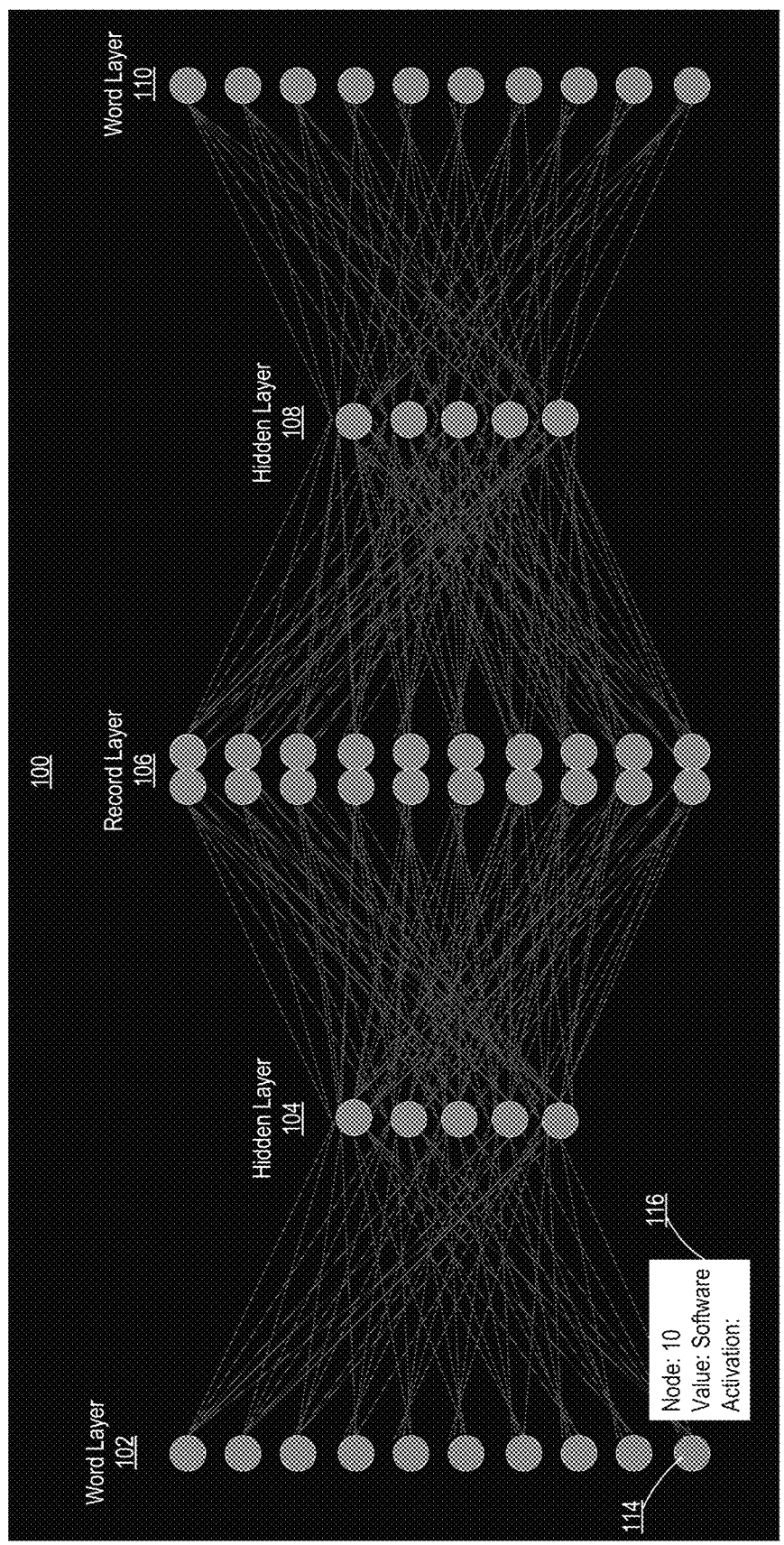
FIG. 2 illustrates a user interface displaying information associated with a node of a layer according to one embodiment.

When a user uses an input device (e.g., a pointing device) of the client device to place a cursor over an interface element (e.g., node or connection) included in the user interface, the visualization tool causes the user interface to display information associated with the element. FIG. 2 illustrates the user interface when a cursor is placed over node 114 of word layer 102. Based on the placement of the cursor over node 114, interface window 116 is displayed by the user interface. The interface window 116 indicates that node 114 is node number "10" in the word layer 102 and that the value of the node 114 is "software." A value is the entity that a node represents in the neural network 100. Hence, node 114 represents the word "software." The interface window 116 also includes an indication of the activation level of the node 114. In this example, the neural network 100 has not been activated. As a result, the interface window 116 does not include a level associated with the "Activation."

Figure 3:
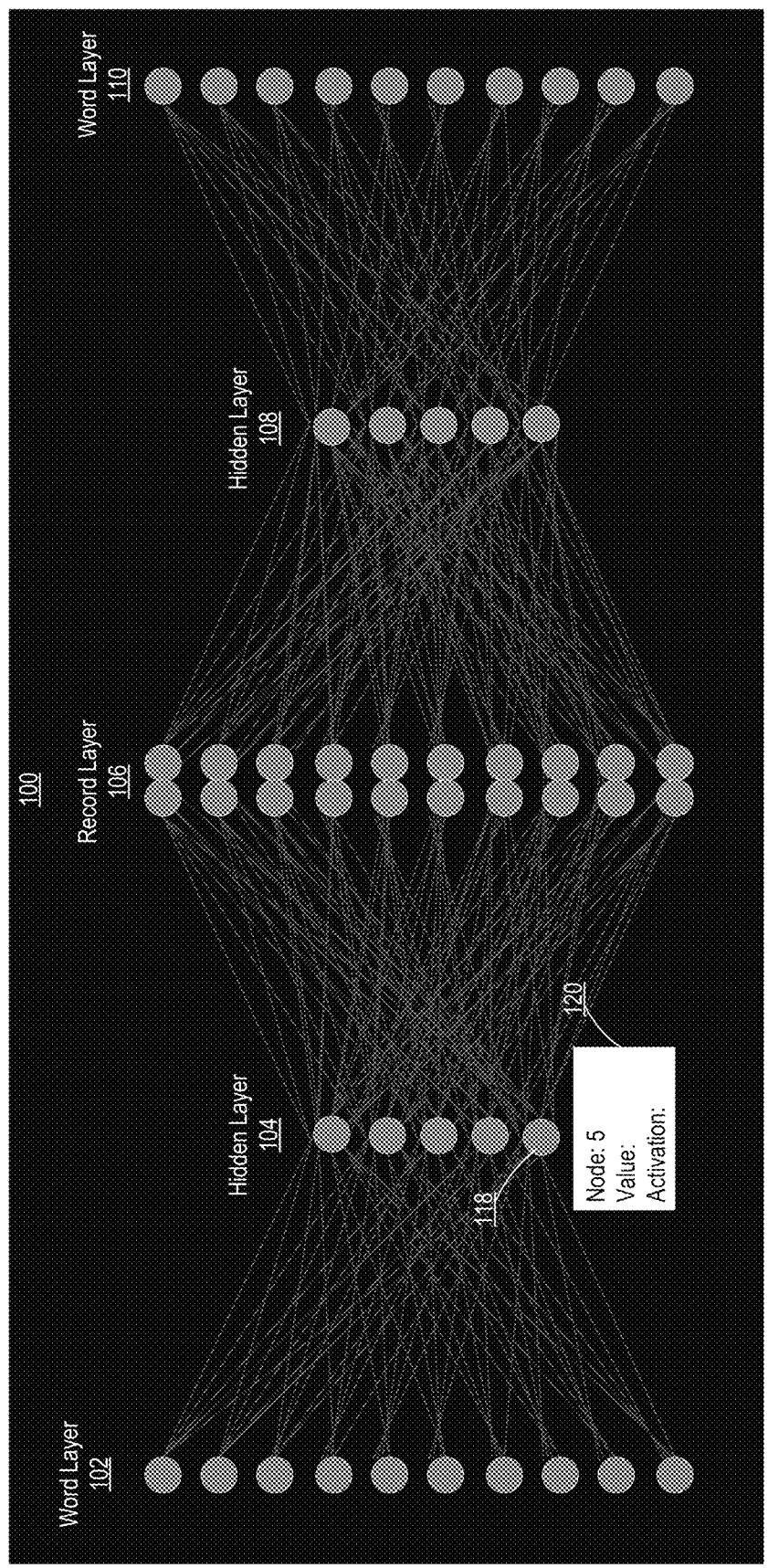
FIG. 3 illustrates a user interface displaying information associated with a node of a hidden layer according to one embodiment.

FIG. 3 illustrates the user interface when the cursor is placed over node 118 of the hidden layer 104. As can be seen interface window 120 is displayed and it includes information indicating that node 118 is node number "5" in the hidden layer 104, that the node has no value and there is no activation level currently associated with node 118. Since node 118 is part of hidden layer 104, the entity that the node 118 corresponds to is not known. As a result, no "value" is included in interface window 120. Similar to placing the cursor over a node, the cursor can also be placed over a connection. In one embodiment, when the cursor is placed over a connection, the weight associated with the connection is displayed.

The colors of the nodes and connections of the neural network 100 are displayed as being the same color in FIGS. 1-3 because the neural network 100 has not been activated. However, the neural network 100 can be activated by providing an input to the neural network 100. One way to provide an input is to select a node from a layer (e.g., an input layer). In one embodiment, when a node is selected, the node is automatically given a specific activation level. A user selecting a node as an input and an activation level being associated with the node may be referred to as a "one-hot activation." As an example, when a node is selected, the node may be given an activation level of one. If the node is selected again, the node is given an activation level of zero. Hence, in this example, the node activation level can be toggled between zero and one by selecting the node. In other embodiments, when a node is selected, a field is displayed in which a user can enter an activation level to assign to the node.

Figure 4A:
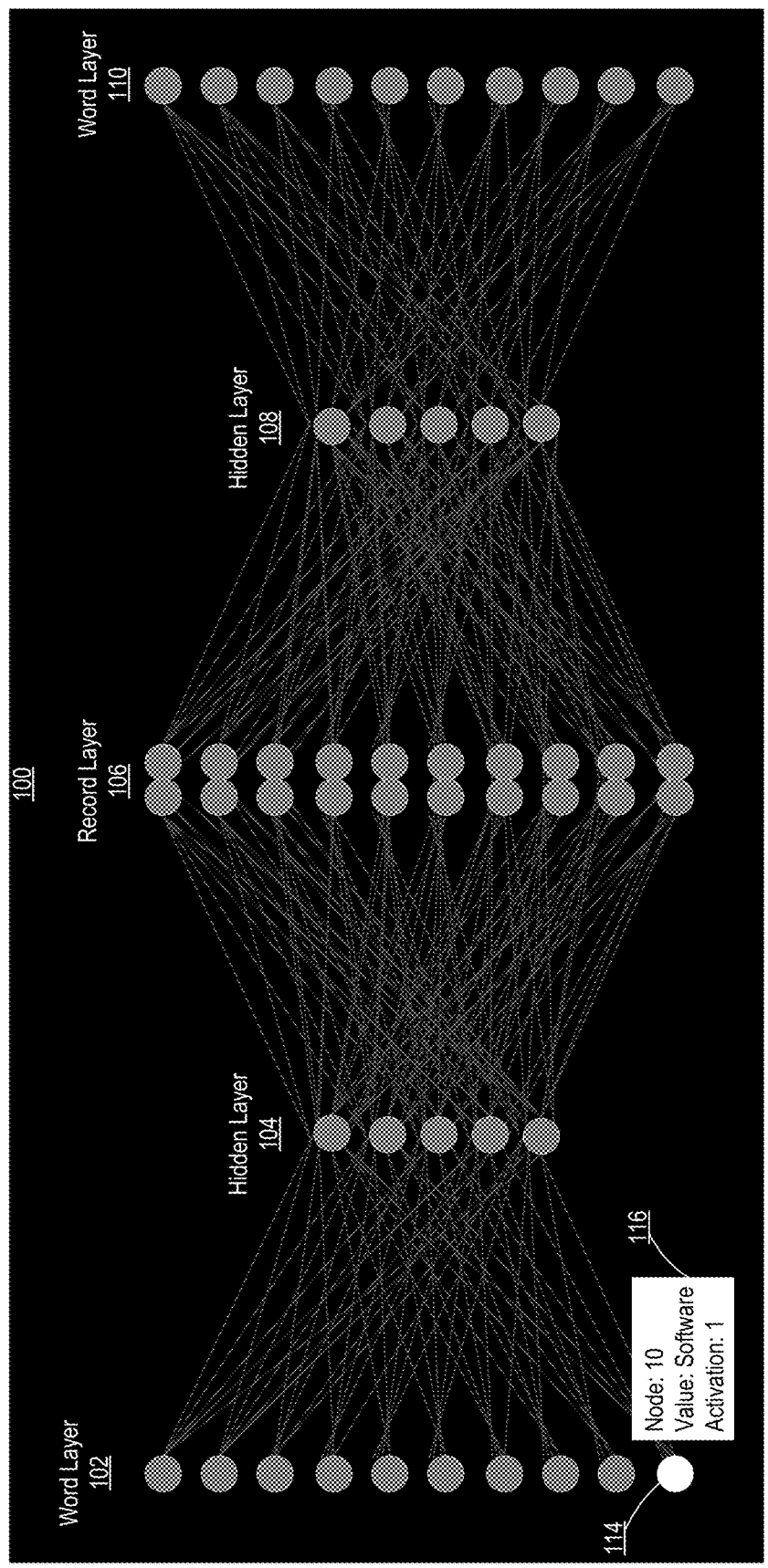
FIGS. 4A-4F illustrate a user interface displaying an input processed by a neural network according to one embodiment.

FIGS. 4A-4F illustrate the activation of a node of the neural network 100 displayed by the user interface and the effects on the neural network 100. FIG. 4A illustrates node 114 of the word layer 102 being selected as an input for the neural network 100. As shown by interface window 116 of FIG. 4A, node 114 is automatically given an activation level of one based on the selection of node 114 through the user interface. In one embodiment, the color of each node in the user interface is used to show the corresponding activation level of the node. In the example of FIGS. 4A-4F, the closer the activation level of a node is to a lower limit of zero, the darker grey the node appears in the user interface and the closer the activation level of a node is to an upper limit of one, the more white the node appears. FIG. 4A illustrates node 114 in a white color because an activation level of one is associated with the node 114. The other nodes in word layer 102 are still dark grey because those nodes have not been activated and as a result they each have an activation level of zero. Even though a single node is illustrated as being activated in FIG. 4A, additional nodes could be activated in the word layer 102 by being selected.

In other embodiments, if the activation level of a node is above a threshold (e.g., 0.5), the node is displayed by the user interface in a shade of green. The closer the activation level of the node is to an upper limit (e.g., one), the brighter the green of the node. If the activation level of the node is below the threshold, the node is displayed in a shade of red. The closer the activation level of the node is to a lower limit (e.g., zero), the brighter the red of the node.

Figure 4B:
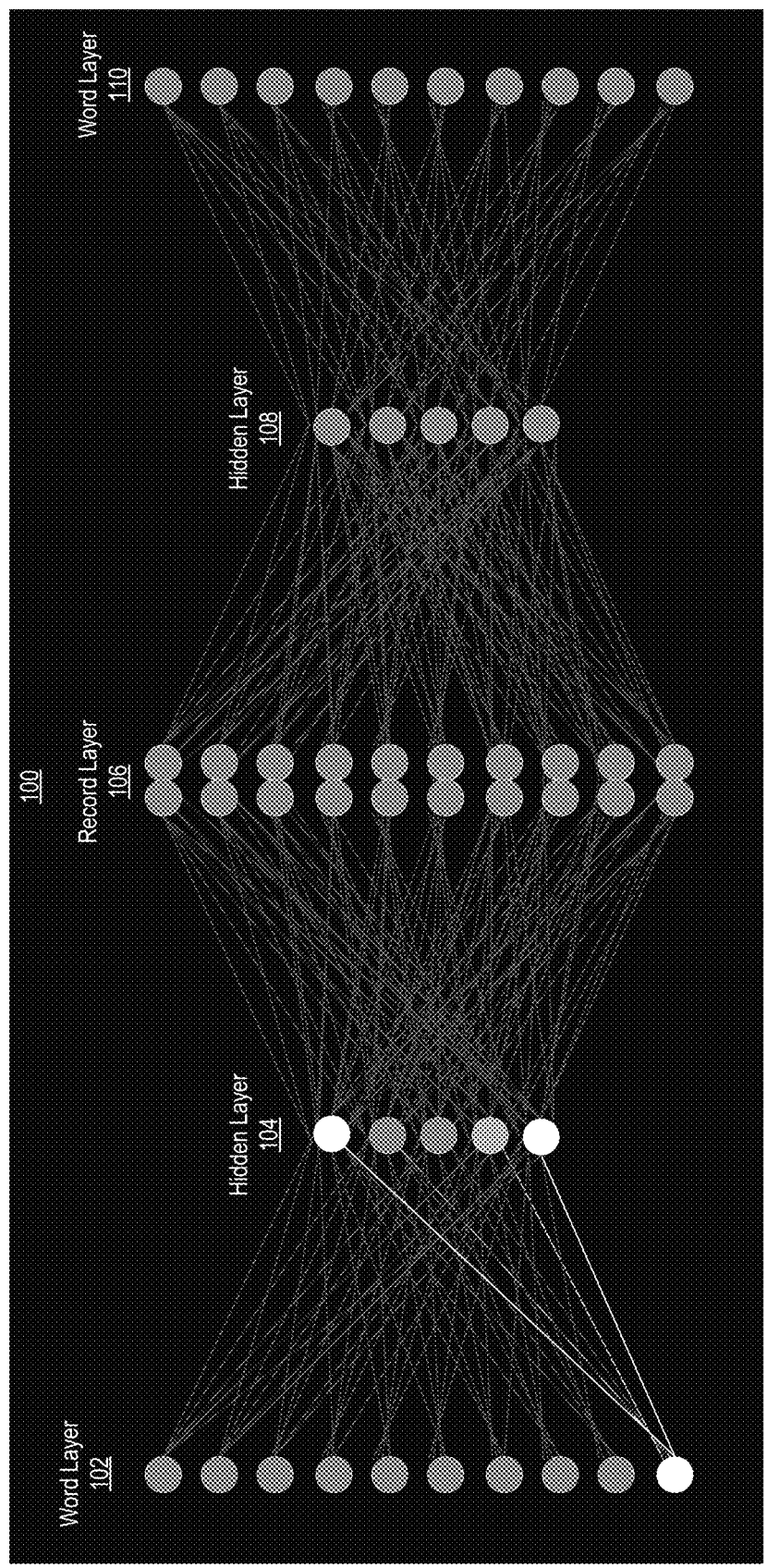

After node 114 of word layer 102 is activated, activation levels are determined for each node of the hidden layer 104. The activation level of a node in the hidden layer 104 is determined based on the weights of the connections the hidden layer node has with the word layer 102 and activation levels of the nodes in the word layer 102 to which the hidden layer node is connected via the connections. As shown by FIG. 4B, the user interface displays each node of the hidden layer 104 in a color that corresponds to the activation level determined for the node.

In one embodiment, a data flow value is also determined for each connection between the word layer 102 and the hidden layer 104. A data flow value is determined for a connection based on the weight of the connection and/or the activation level of a node connected via the connection. For example, the data flow value of a connection between the word layer 102 and the hidden layer 104 may be the weight of the connection multiplied by the activation level of the node in the word layer 102 connected via the connection.

Figure 7:
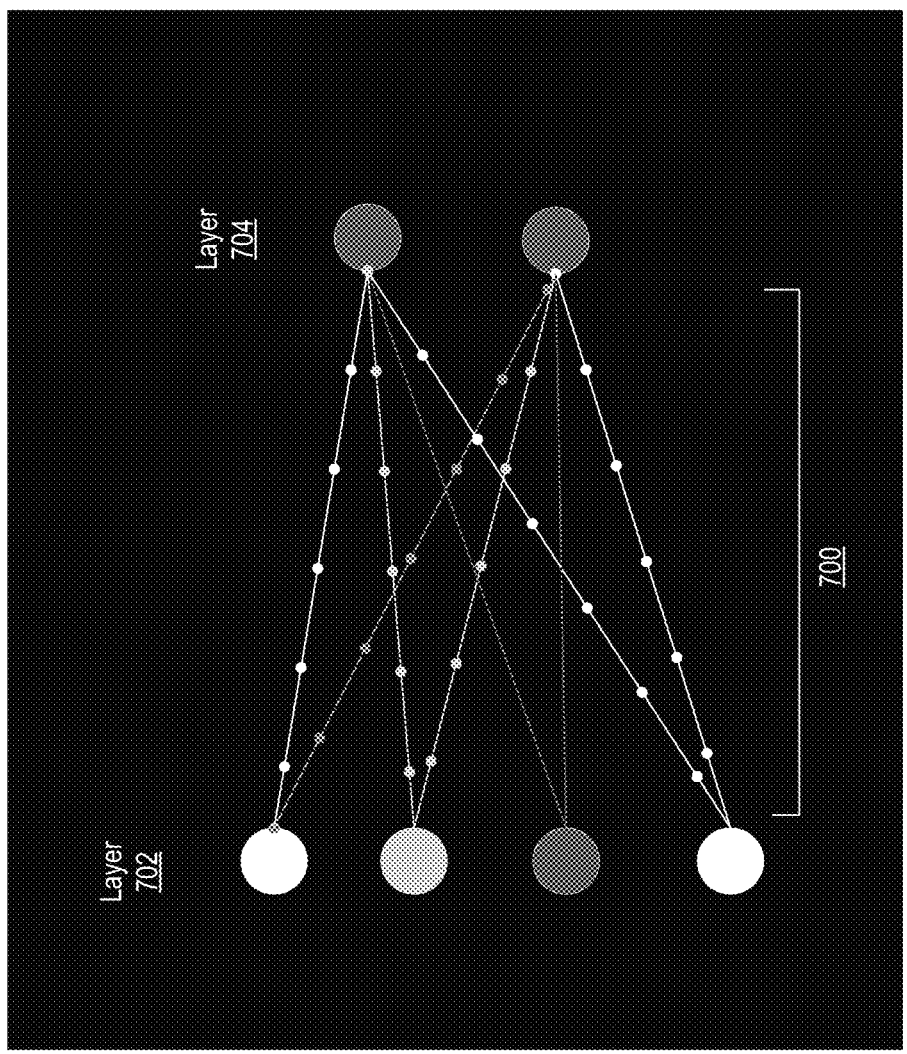
FIG. 7 illustrates a user interface displaying an animation along connections between two layers according to one embodiment.

In one embodiment, prior to or at the same time as displaying the activation levels of the hidden layer nodes via colors, data propagation between the two layers is shown as an animation. For each connection that has a data flow value above a lower limit (e.g., zero), the user interface displays an animation of dots moving along the connection. In one embodiment, the color of the dots moving along the connection are a shade of a color (e.g., blue) and the intensity of the color is based on the data flow value of the connection. For example, the higher the data flow value of a connection, the brighter blue the dots are displayed for the connection and the lower the data flow value the darker the dots. FIG. 7 is described below and provides an example of dots along a connection. In another embodiment, instead of the color of the dots being dependent on the data flow value, the number or size of dots included along a connection is based on the data flow value (e.g., the higher the data flow value, the more dots are included along the connection).

In one embodiment, the animation of the data propagation between the two layers is shown for a period of time (e.g., a set period of time or as long as it takes to determine the activation levels of nodes of a layer). After the period of time, the dots along the connections are no longer displayed by the user interface. In one embodiment, after the animation of the data flow, each connection between the word layer 102 and hidden layer 104 is displayed by the user interface as a solid line in a shade of a color (e.g., grey/white), where the intensity of the color is based on the data flow value of the connection. FIG. 4B illustrates the colors of the connections between word layer 102 and hidden layer 104 being according to their respective data flow value.

Figure 4C:
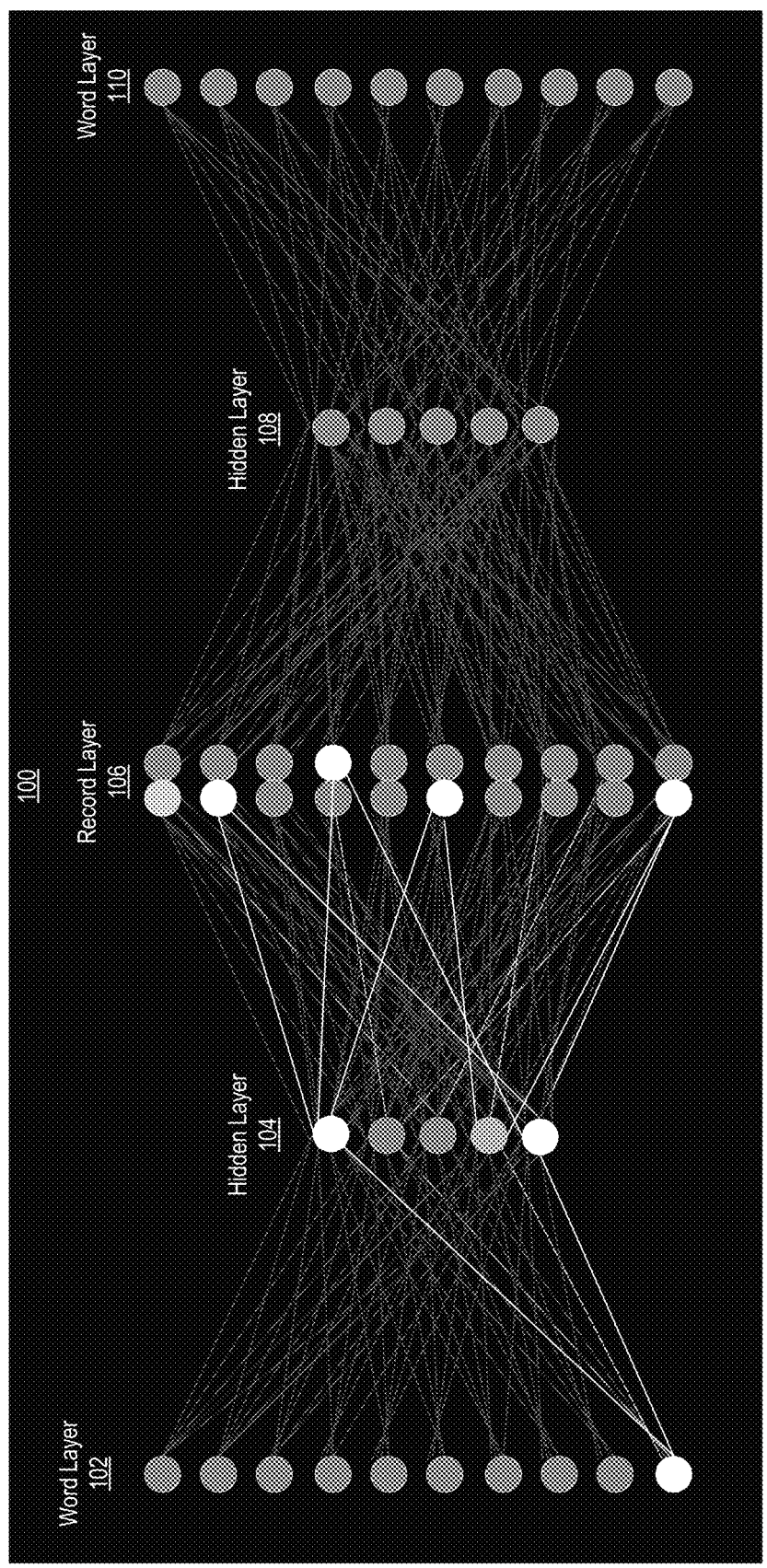

After activation levels are determined for hidden layer 104, activation levels are determined for record layer 106 and data flow values are determined for the connections between the hidden layer 104 and the record layer 106. FIG. 4C illustrates the user interface displaying each node of the record layer 106 in a color that corresponds to the activation level determined for the node. FIG. 4C also shows each connection between hidden layer 104 and record layer 106 in a color that corresponds to the data flow value determined for the node.

Figure 4D:
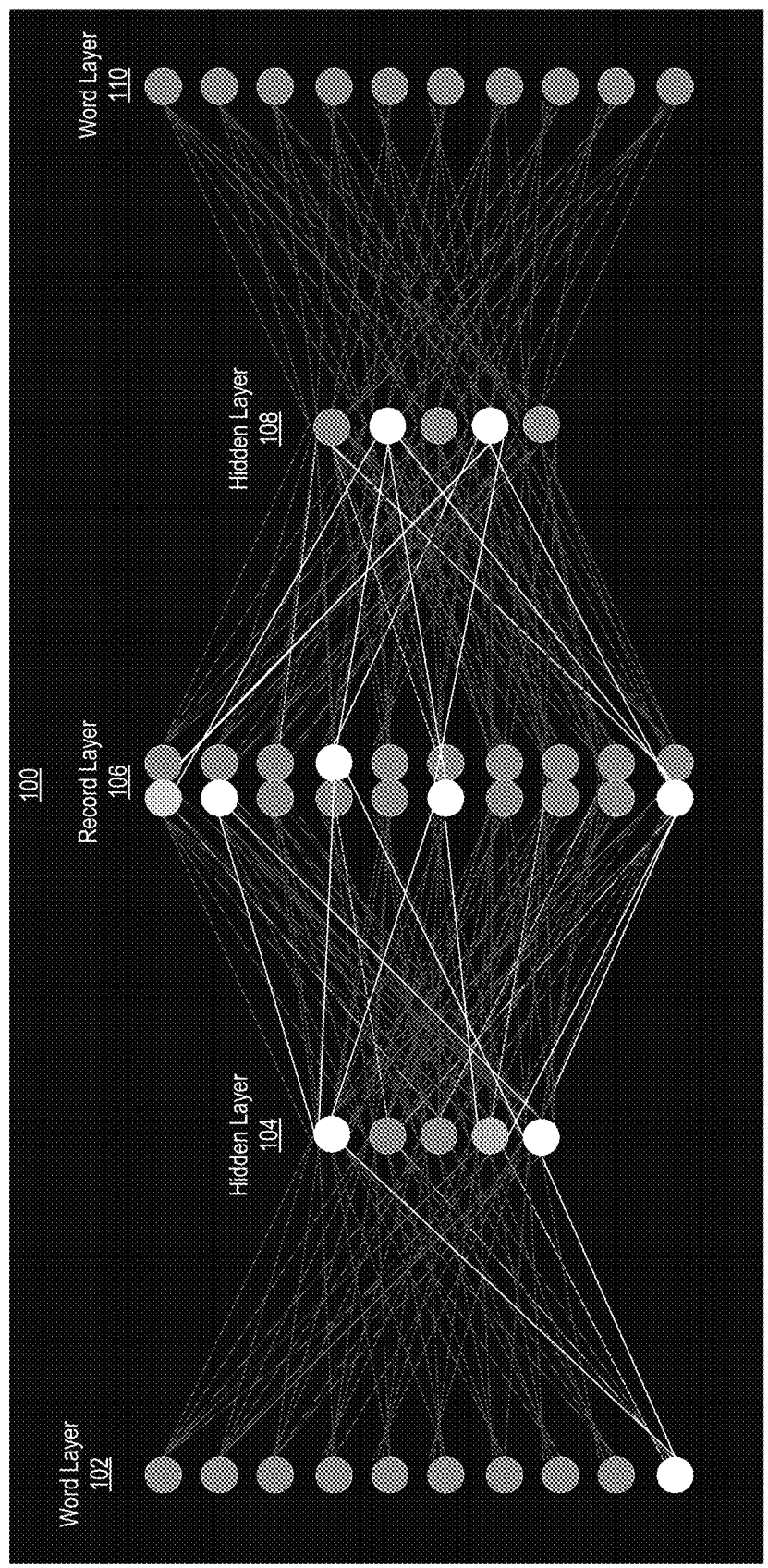
Figure 4E:
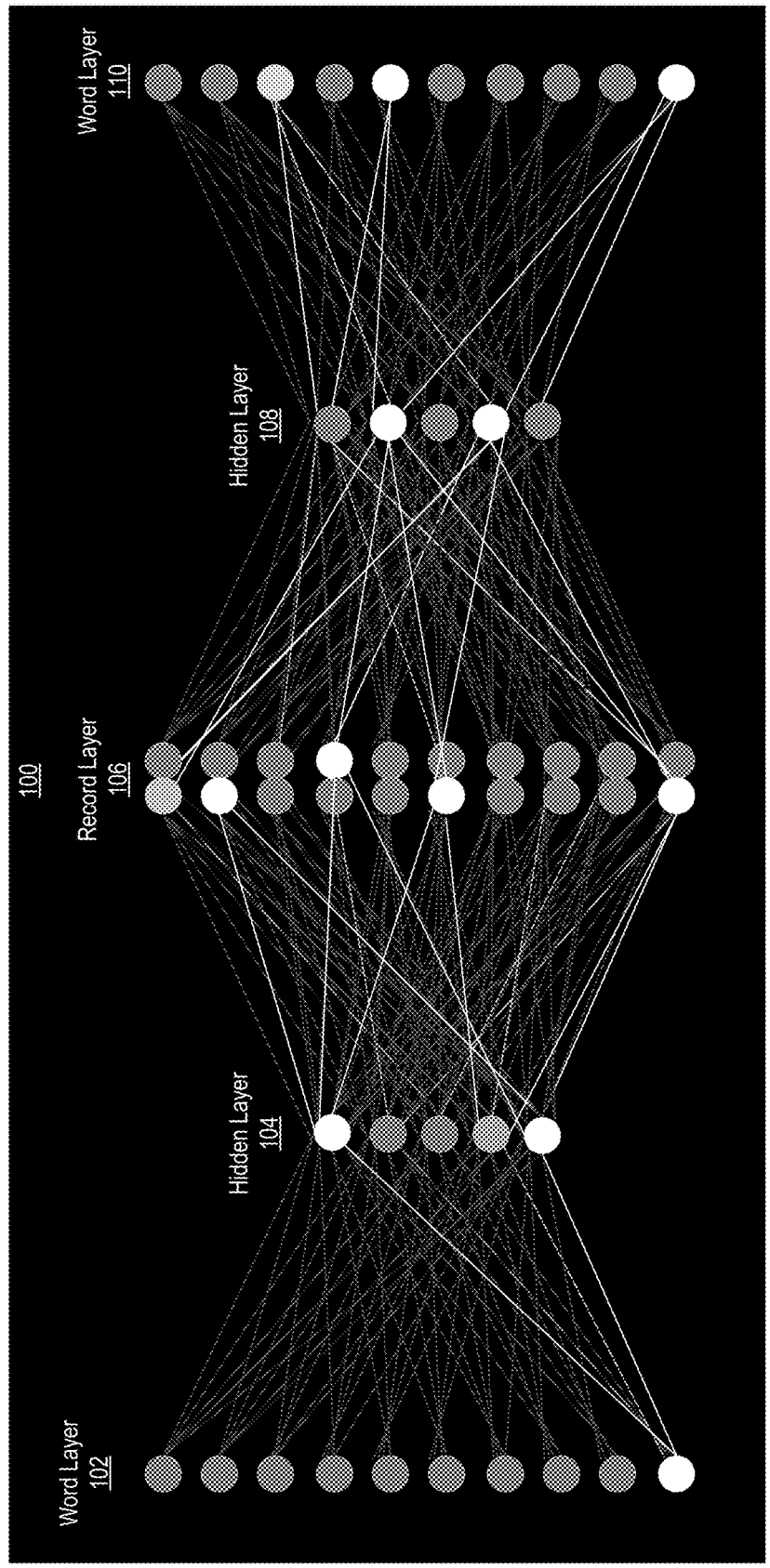

As illustrated by FIG. 4D, after activation levels are determined for record layer 106, activation levels are determined for the hidden layer 108 and data flow values are determined for the connections between record layer 106 and hidden layer 108. FIG. 4E illustrates subsequent to hidden layer 108, determining activation levels for word layer 110 and data flow values for the connections between hidden layer 108 and word layer 110.

After the input has been applied to the neural network 100 (i.e., the input has propagated through the neural network 100), the user interface displays results for one or more layers of the neural network 100. In one embodiment, the user interface displays results for specific layers requested by a user of the visualization tool. The results for a layer include information on the entities represented by the nodes with the highest activation levels in the layer (e.g., top ten activation levels). In one embodiment, the entities are ordered in the results based on the activation level of the corresponding node (e.g., entity with highest activation level on top).

Figure 4F:
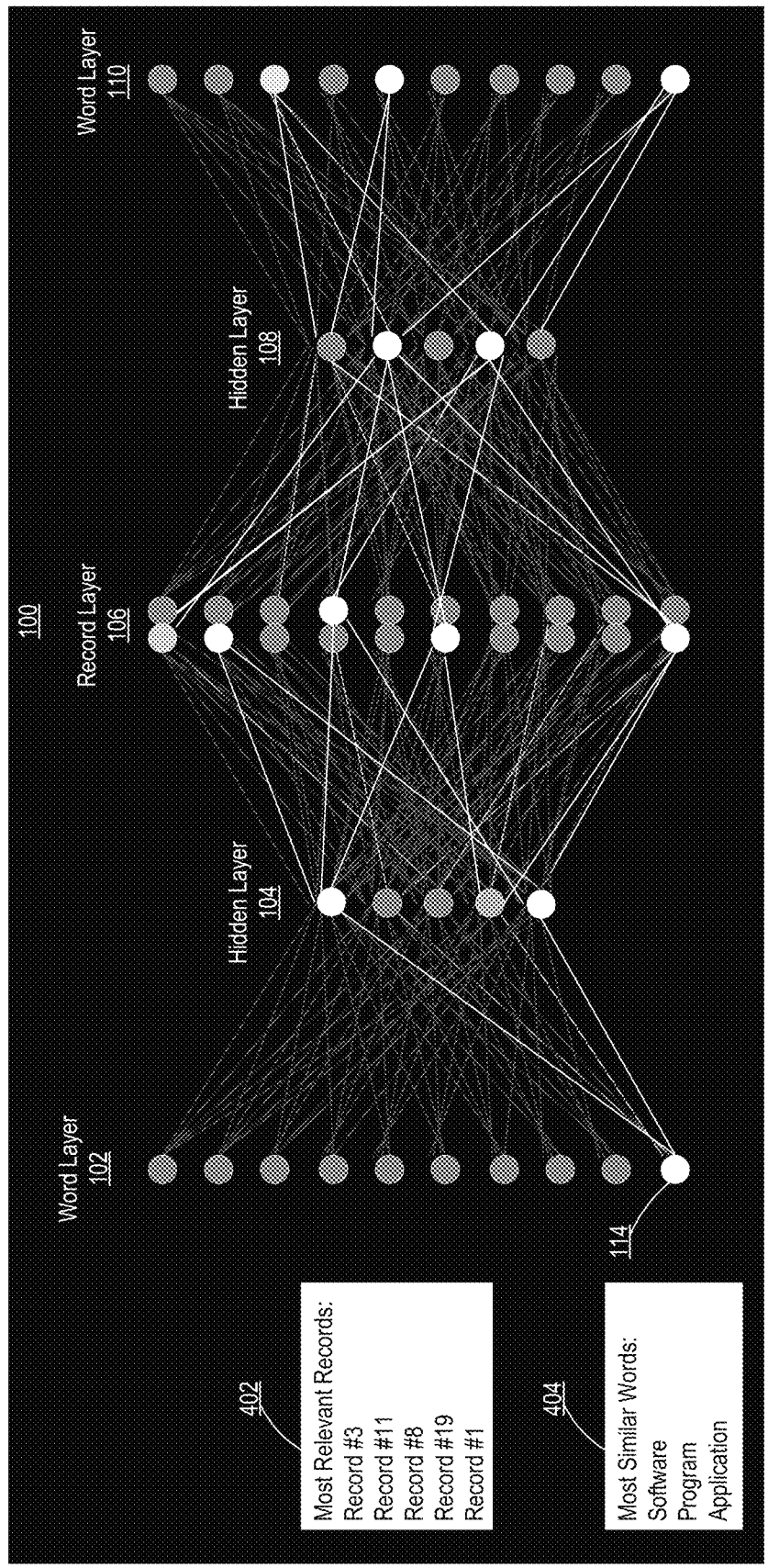

FIG. 4F illustrates the user interface after activation of node 114 has propagated through the neural network 100. The user interface displays interface window 402 and interface window 404. Interface window 402 includes results from record layer 106. Specifically, interface window 402 includes information on the five records associated with nodes in the record layer 106 with the top five activation levels. The five records are displayed as being the most relevant to the word "software" which was input via node 114. The information included in the interface window 402 for a record may include one or more of the following: name, storage location, edit date, and a numeric identifier. Interface window 404 includes results from word layer 110. Specifically, interface window 404 includes information on the three words associated with nodes in word layer 110 with the top three activation levels.

Figure 5A:
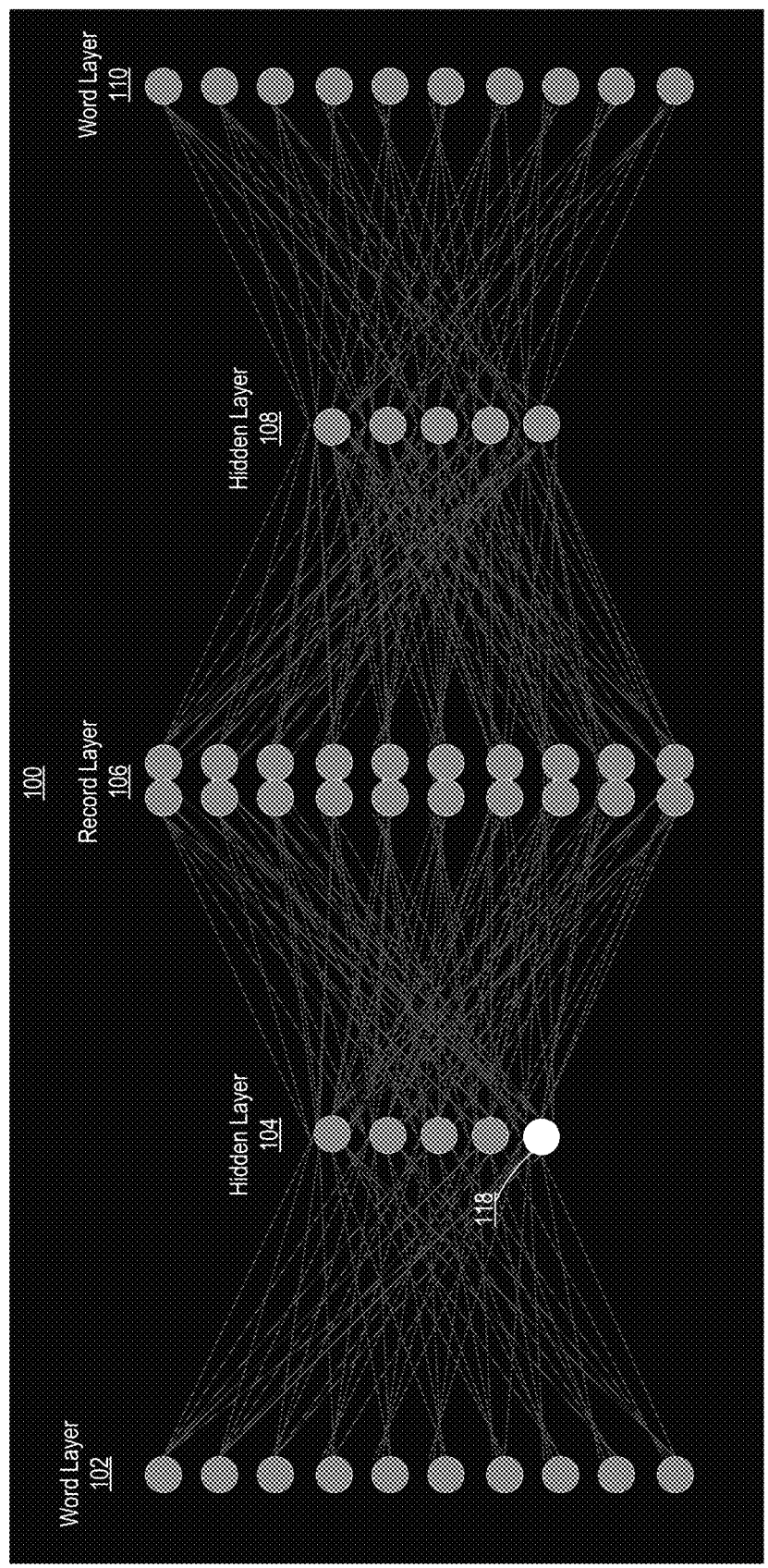
FIGS. 5A and 5B illustrate activating different nodes of a neural network through a user interface according to one embodiment.
Figure 5B:
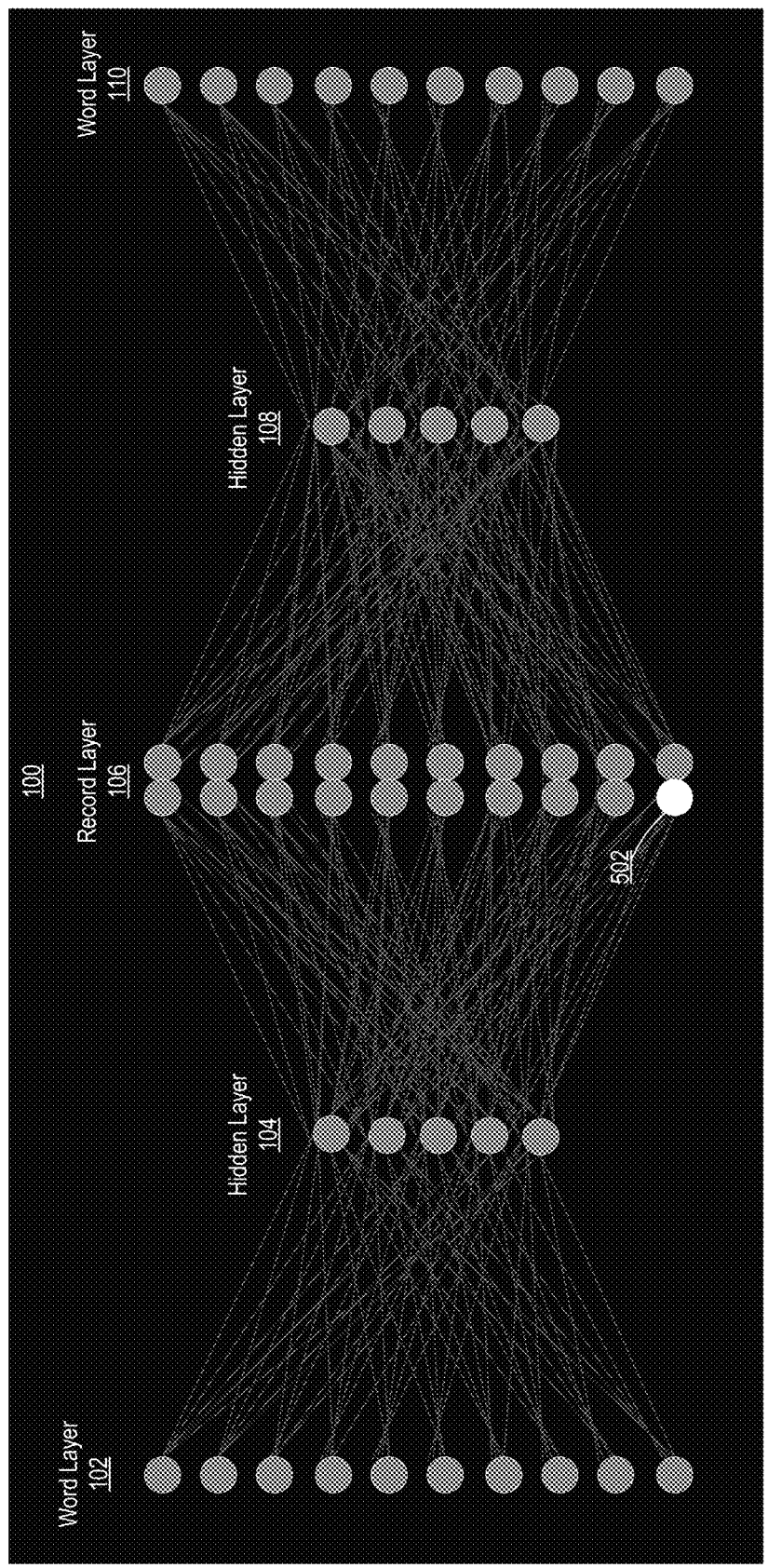

In FIG. 4A a node in the word layer 102 was selected as an input to the neural network 100. However, nodes in other layers can be selected as inputs to the neural network 100 as long as the topology of the neural network allows for it. For example, FIG. 5A illustrates node 118 in the hidden layer 104 being activated as an input and FIG. 5B illustrates node 502 in record layer 106 being activated. In one embodiment, when the description of the neural network is provided, information is also provided as to which layers can be used as input layers.

Figure 6A:
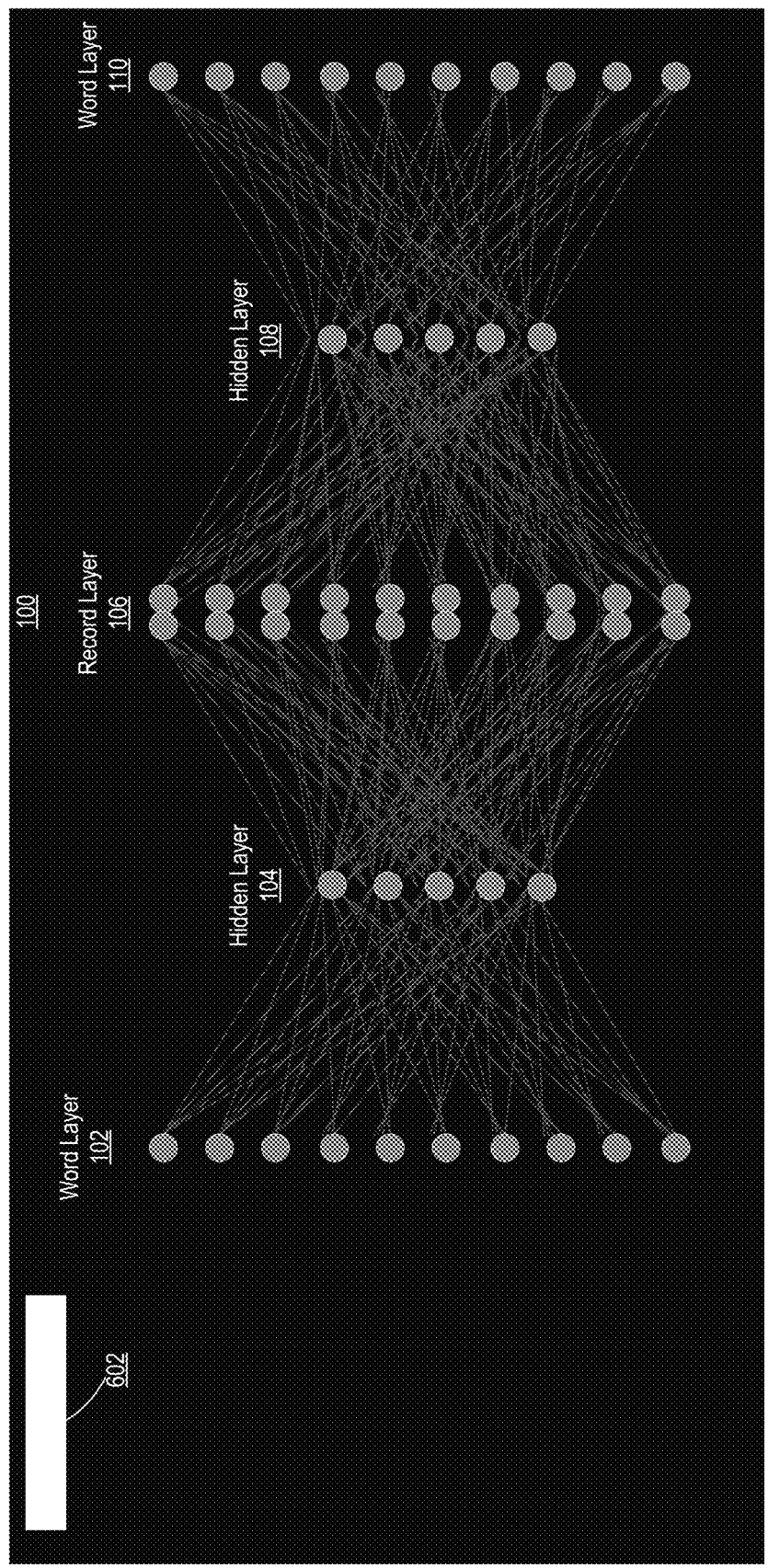
FIGS. 6A-6C illustrate entering an input through an input field of a user interface according to one embodiment.
Figure 6B:
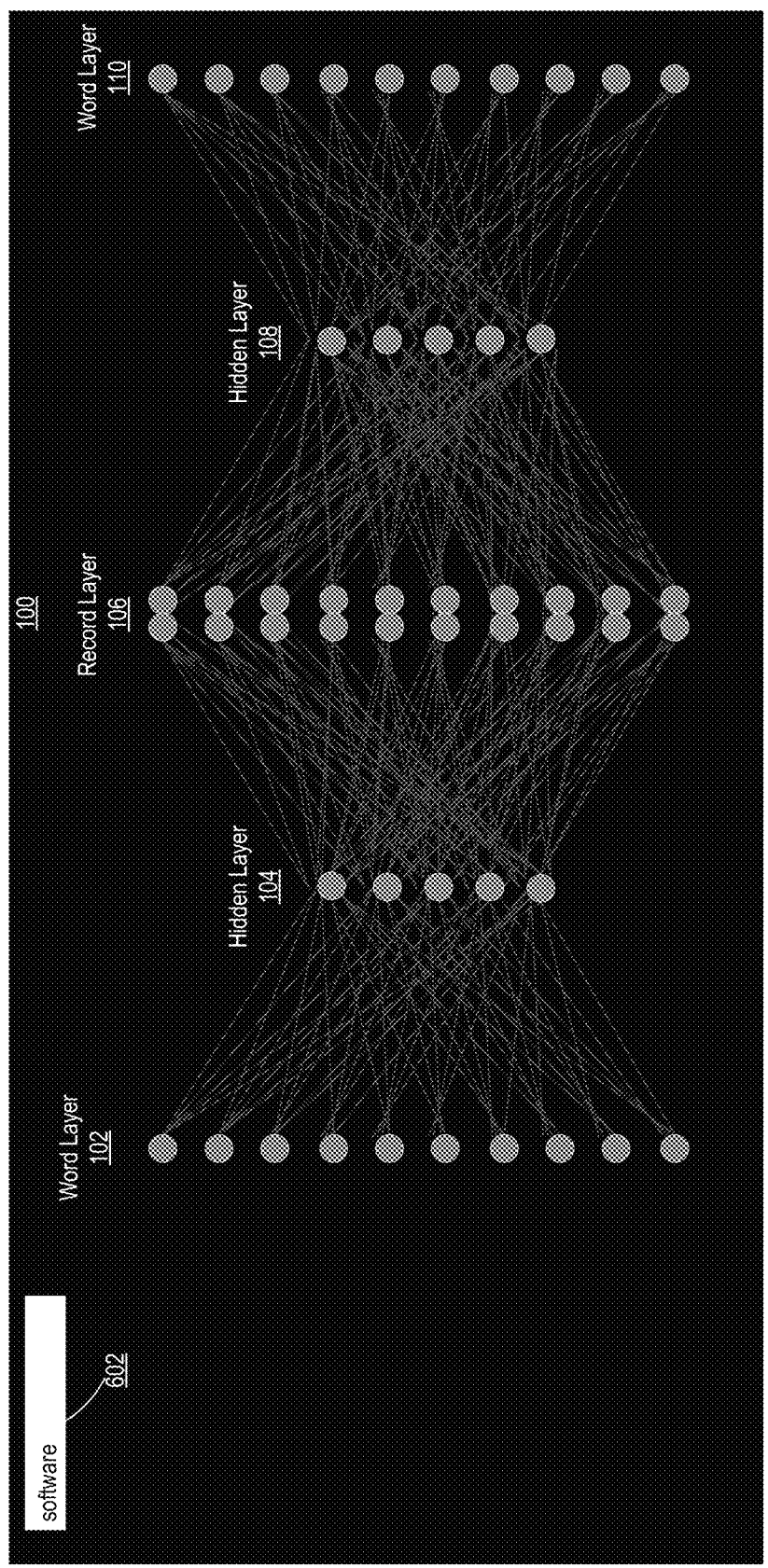
Figure 6C:
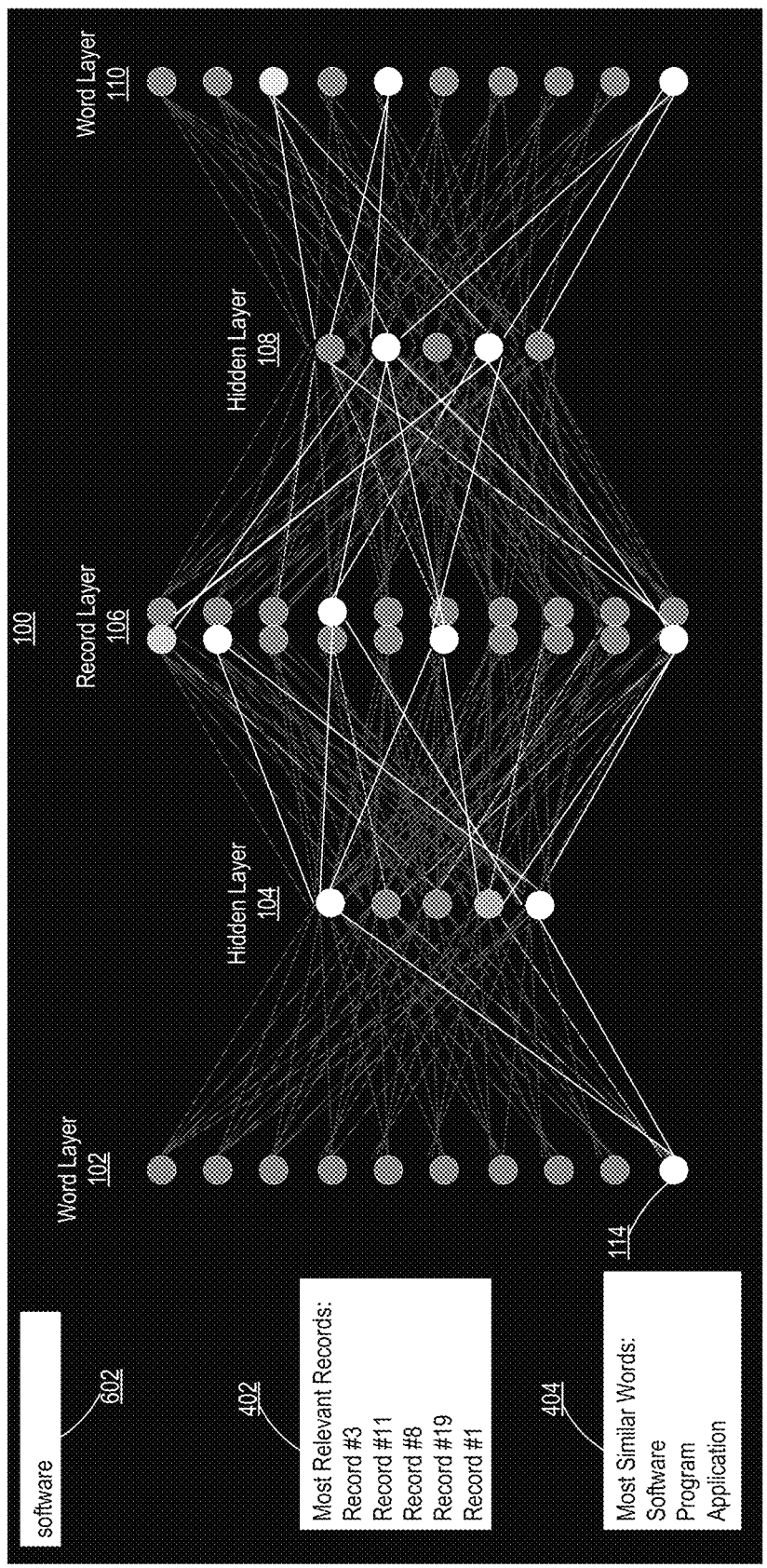

FIGS. 4A, 5A, and 5B illustrated an input being provided to the neural network 100 by selecting a node. However, an input can also be provided by a user through an input field of the user interface. Through the input field the input can be entered. FIG. 6A illustrates the user interface including input field 602. FIG. 6B illustrates the word "software" entered by a user into input field 602. FIG. 6C illustrates that based on entering "software" into the input field 602, node 114 is activated as an input and the input propagates through the neural network 100. The results of FIG. 6C are the same as those of FIG. 4F which were caused by node 114 being selected and activated.

As described above, when data flow values are determined for connections of a neural network, dots can be displayed along connections that have a data flow value above a lower limit. The color intensity of the dots depends on the data flow value of the respective connection. FIG. 7 illustrates connections 700 between layers 702 and 704. As can be seen, the color of connections with dots varies. As can also be seen, some connections do not have dots which indicates that the data flow value of those connections is below a lower limit.

Hence, through the use of colors and the other visual aids described above, the user interface generated by the visualization tool allows a user, such as an engineer or data scientist, to see how a complex neural network is functioning. Further, by interacting with the user interface (e.g., by providing specific inputs or placing a cursor over a node/connection), the user can determine whether the neural network is operating as desired. Based on the information gathered from the user interface, the user may determine, for example, that the neural network has not been trained properly (e.g., overfitting has occurred) or that changes need to be made to the neural network and then the user can then take appropriate action. In contrast without the visualization tool it would be difficult to obtain information about the functioning of the neural network, which in turn slows down the development of a neural network.

Figure 8:
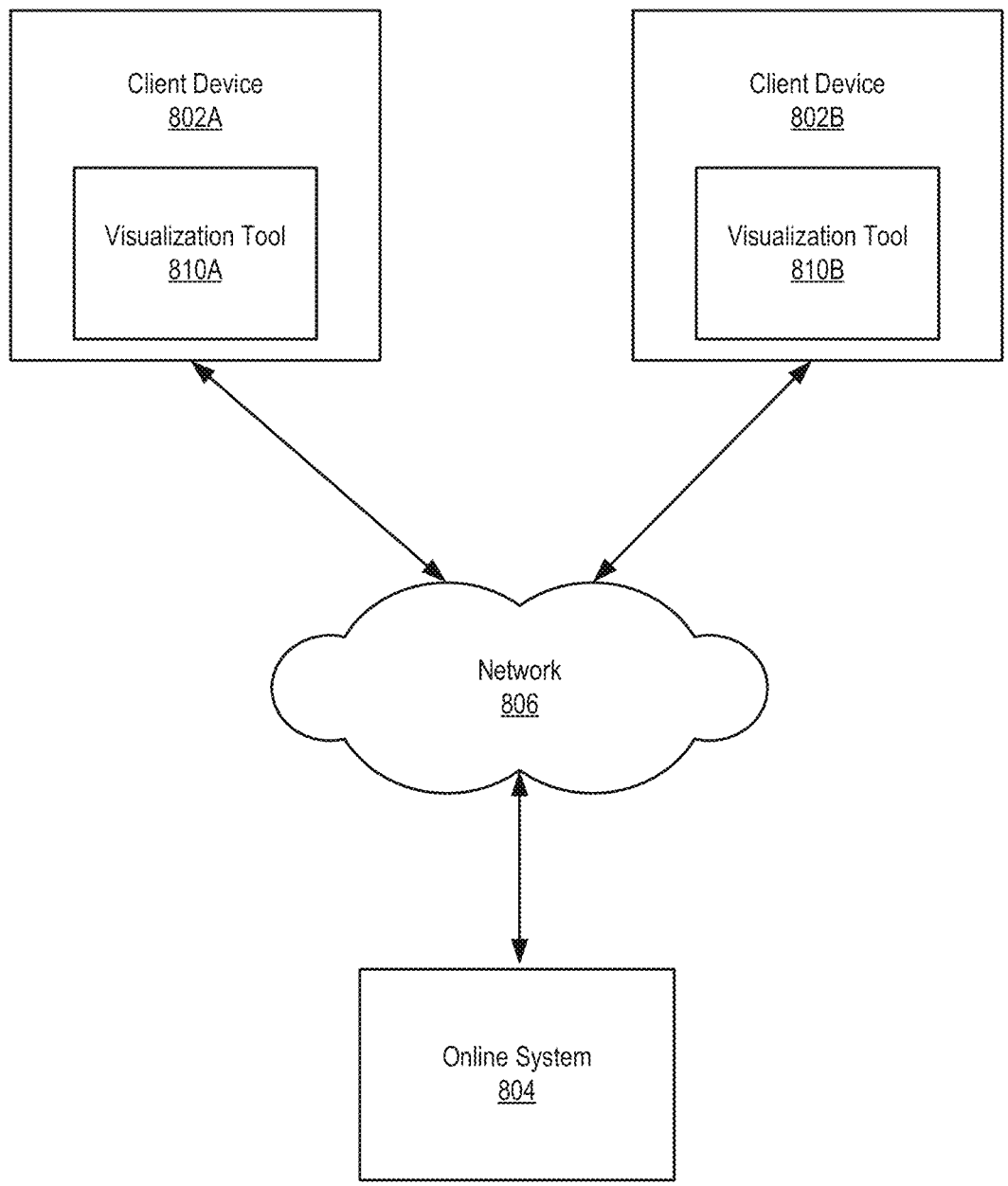
FIG. 8 is a block diagram illustrating a visualizing environment according to one embodiment.

FIG. 8 is a block diagram illustrating a visualizing environment 800 according to one embodiment. FIG. 8 illustrates client devices 802A and 802B and online system 804 connected via a network 806. Although a select number of each entity are shown in FIG. 8, embodiments can have more or less of each entity (e.g., additional client devices 802).

The network 806 represents the communication pathways between the online system 804 and client devices 802. In one embodiment, the network 806 is the Internet and uses standard communications technologies and/or protocols. Thus, the network 806 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 806 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 806 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

A client device 802 is a device used by a user to communicate with entities connected to the network 806, such as the online system 804. A client device 802 may be, for example, a desktop computer, laptop, smart phone, tablet computer, or personal digital assistant (PDA). A client device 802 includes a visualization tool 810 that generates and displays a user interface through the client device 802. The user interface allows users to see a visual of neural networks and the functioning of neural networks. Additionally, through the user interface users can interact with neural networks. In on embodiment, the visualization tool 810 is an application that runs on the client device 802. In one embodiment, the visualization tool 810 is loaded through a web browser operating on the client device 802.

The visualization tool 810 communicates with the online system 804 as part of displaying the user interface. The online system 804 is a computer system that performs computations for the visualization tool 810 and provides information to the visualization tool 810 for generating and updating the user interface.

Figure 9:
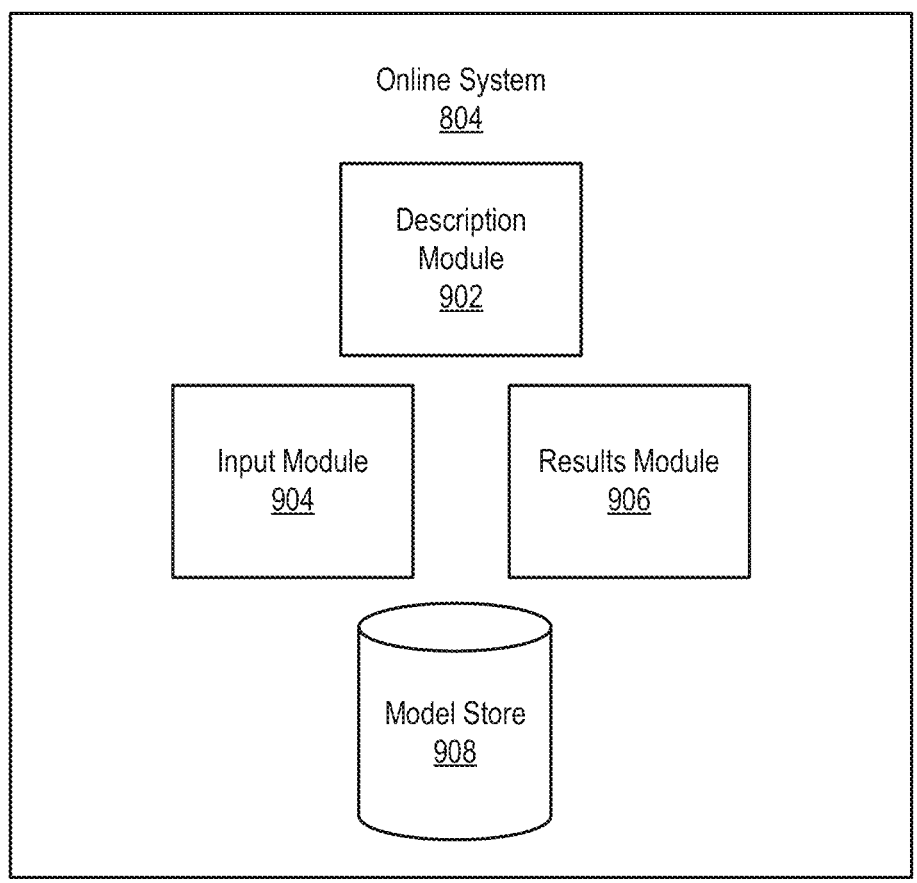
FIG. 9 is a block diagram illustrating components of an online system according to one embodiment.

FIG. 9 is a block diagram illustrating components of the online system 804 according to one embodiment. The online system 804 includes a description module 902, an input module 904, a results module 906, and a model store 908. Those of skill in the art will recognize that other embodiments can have different and/or other components than the ones described here, and that the functionalities can be distributed among the components in a different manner. Additionally, in other embodiments the modules and store of the online system 804 may instead be part of a visualization tool 810 operating on a client device 802. In such embodiments, the functions of the modules described herein are performed locally on a client device 802.

The description module 902 receives descriptions of neural networks from visualization tools 810 through client devices 802. When a visualization tool 810 receives a description of a neural network, for example, from a user or another system, the visualization tool 810 forwards the description to the online system 804. The description received includes one or more of the following: the number of layers of the network, the dimensionality of each layer (e.g., number of nodes in each layer), data associated with each node (e.g., information on an entity represented by each node), the connections between nodes/layers (e.g., nodes between two layers are fully connected) and the weight of each connection.

When a description of a neural network is received, the description module 902 stores the description in the model store 908. In one embodiment, for weights of connections between two layers, the description module 902 stores in the model store 908 a matrix that includes the weights. In one embodiment, the description module 902 also stores with the description information as to which one or more layers of the neural network can be input layers and which one or more layers are output layers.

When a visualization tool 810 receives a request from a user to display a neural network, the visualization tool 810 forwards the request to the online system 804 and the description module 902 retrieves from the model store 908 the description of the neural network. The description module 902 transmits the description to the client device 802 of the visualization tool 810 for displaying a visual of the neural network.

Along with transmitting the description, the description module 902 also transmits to the client device 802 display information as to how to display the neural network. In one embodiment, for each layer of the neural network, the description module 902 transmits display information that indicates how many rows of nodes to display for the layer and how many nodes to include per row. In one embodiment, the description module 902 uses a node file to determine how to display nodes of a layer. The node file includes rules on how to display nodes of a layer based on the number of nodes included in the layer. The description module 902 also transmits display information that indicates the one or more colors in which to display the nodes and connections between the nodes. In one embodiment, since the neural network has not been activated, the description module 902 transmits display information indicating that the nodes and connections be displayed in colors that indicate that the neural network has not been activated. Hence, based on the information transmitted to the client device 802, the visualization tool 810 is able to display a visual of the neural network and provide the user information associated with nodes and connection of the network (e.g., if the user requests information by placing a cursor over a node/connection).

The input module 904 processes inputs provided to neural networks. When a user provides an input for a neural network through a visualization tool 810, for example by selecting a node or entering an input in an input field, the input module 904 identifies the description of the neural network in the model store 908 and performs the necessary computations based on the input. In one embodiment, as part of performing the computations, the input module 904 determines the layer associated with the input (determines the input layer).

The input module 904 determines an activation level for each node of the input layer based on the input. The input module 904 also determine a data flow value for each connection between the input layer and next layer in the network. In one embodiment, for a connection, the input module 904 determines the data flow value to be the weight of the connection multiplied by the activation level of the node in the input layer to which is connected. For each connection for which the activation level is above a lower limit (e.g., zero), the input module 904 transmits instructions to the visualizing tool 810 to display an animation of dots moving along the connection for a set period of time. In one embodiment, the input module 904 also instructs the visualization tool 810 to display the dots of each connection in a color that corresponds to the data flow value determined for the connection. In another embodiment, the input module 904 instructs the visualizing tool 810 to display a certain number of dots along each connection that corresponds to the data flow value determined for the connection. The input module 904 also instructs the visualizing tool 810 to display the connections without the dots after the set period of time in colors that corresponds to their respective data flow values.

Additionally, for the nodes in the next layer, the input module 904 computes their corresponding activation levels. In one embodiment, the input module 904 computes the activation levels using matrix multiplication. For the input layer the input module 904 generates a matrix according to the dimensionality of the input layer and includes in the matrix the corresponding activation levels of the input layer nodes. The input module 904 identifies in the model store 908 the matrix that includes the weights of the connections between the input layer and the next layer. The input module 904 multiplies the two matrices to obtain the activation levels for the nodes of the next layer. The input module 904 transmits to the visualization tool 810 the activation level determined for each node of the next layer and instructions to display each node in a color that corresponds to the respective activation level. The input module 904 repeats the process of determining data flow values for each subsequent set of connections and activation levels for each subsequent layer until computations have been performed for each connection and node of the neural network.

The results module 906 communications with visualization tools to present results from applying a neural network to an input. The results module 906 identifies one or more layers of a neural network for which to present results based on an input being processed through the neural network. The results module 906 may identify the one or more layers, for example, based on a user of a visualization tool 810 requesting results for the one or more layers or based on a user identifying the one or more layers as output layers.

For each identified layer, the results module 906 identifies a set number of nodes (e.g., ten) from the layer with highest activation levels. The set number may, for example, be set by a system administrator or by a user of the visualization tool 810. For each identified node, the results module 906 determines information associated with node from the description of the neural network stored in the model store 908. For example, the results module 906 may determine the name of the entity the node represents. The results module 906 transmits instructions to the visualization tool 810 to display an interface window with the information for each identified node. In one embodiment, the information is ordered in the interface window according to the activation level of the corresponding node, where the higher the activation level of a node, the higher the respective information appears in the interface window.

Figure 10:
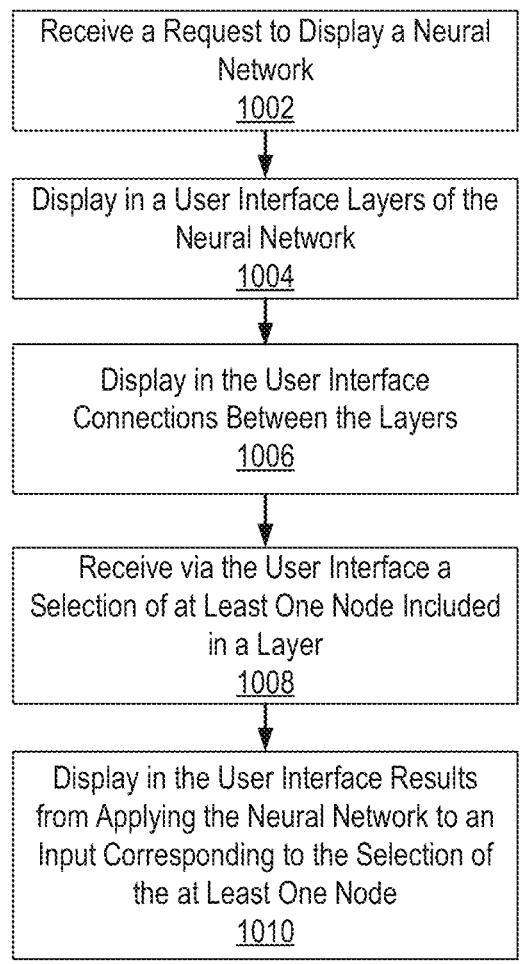
FIG. 10 is a flow chart illustrating operations of a client device in displaying a visual of a neural network according to one embodiment.

FIG. 10 is a flow chart 1000 illustrating operations of a client device 802 in displaying a visual of a neural network according to one embodiment. Those of skill in the art will recognize that other embodiments can perform the steps of FIG. 10 in different orders. Moreover, other embodiments can include different and/or additional steps than the ones described herein.

A client device 802 receives 1002 a request to display a neural network. The client device 802 displays 1004 in a user interface layers of the neural network. Each of the layers includes multiple nodes. The client device 802 also displays 1006 in the user interface connections between the layers.

The client device 802 receives 1008 via the user interface a selection of at least one node included in a layer. The client device 802 displays 1010 in the user interface results from applying the neural network to an input corresponding to the selection of the at least one node.

Figure 11:
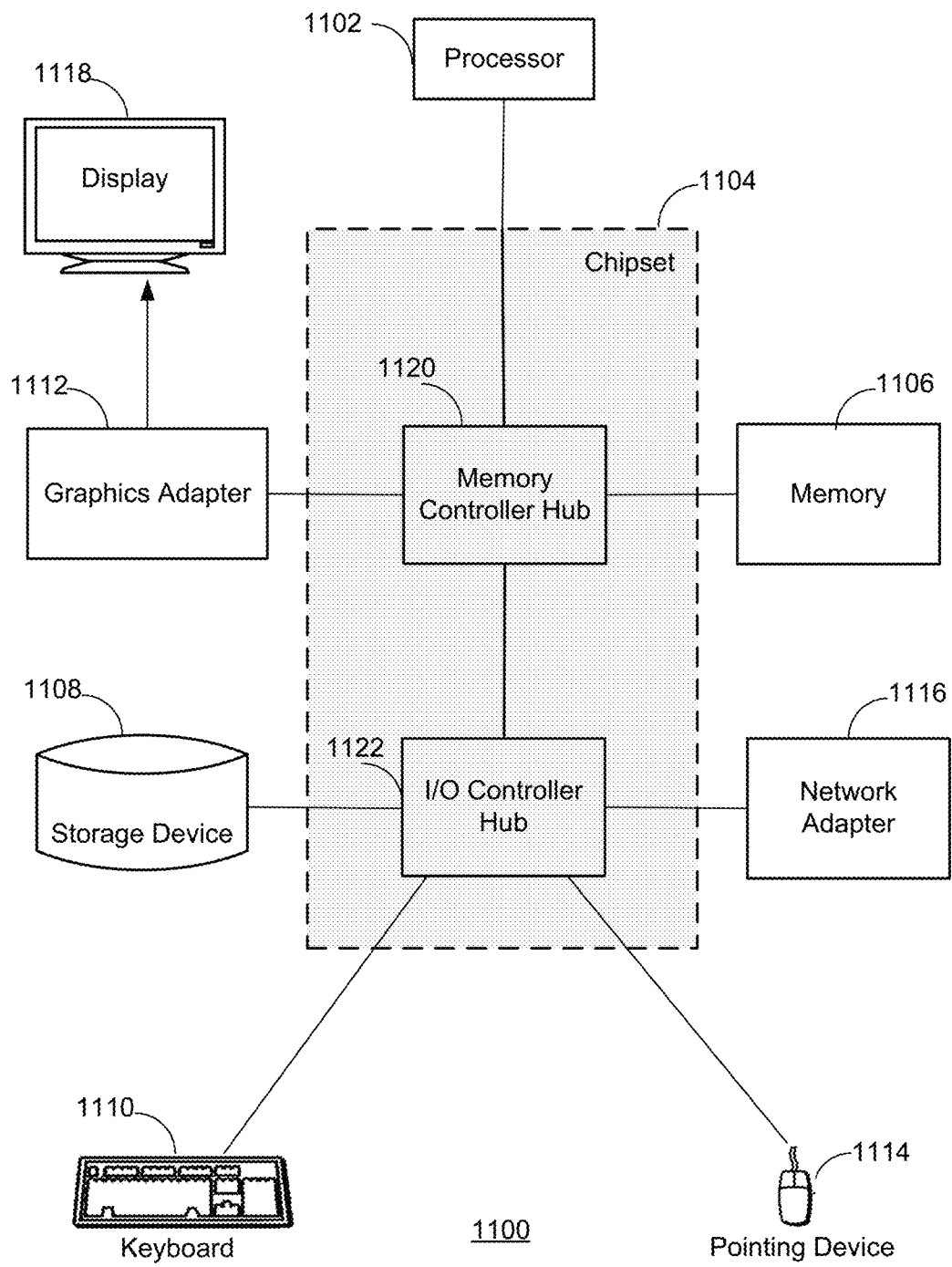
FIG. 11 is a block diagram illustrating a functional view of a typical computer system for use as one of the entities illustrated in the environment of FIG. 8 according to one embodiment.

FIG. 11 is a high-level block diagram illustrating a functional view of a typical computer system for use as one of the entities illustrated in the environment 800 of FIG. 1 according to an embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 200. The graphics adapter 1112 displays images and other information on the display 1118. The network adapter 1116 couples the computer system 1100 to the network 806.

As is known in the art, a computer 1100 can have different and/or other components than those shown in FIG. 11. In addition, the computer 1100 can lack certain illustrated components. For example, a computer system 1100 acting as an online system 804 may lack a keyboard 1110 and a pointing device 1114. Moreover, the storage device 1108 can be local and/or remote from the computer 1100 (such as embodied within a storage area network (SAN)).

The computer 1100 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the entities of FIG. 8 can vary depending upon the embodiment and the processing power used by the entity. For example, a client device 802 may be a mobile phone with limited processing power, a small display 1118, and may lack a pointing device 1114. The online system 804, in contrast, may comprise multiple blade servers working together to provide the functionality described herein.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing"

or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for visualizing a neural network, the method comprising:
   receiving, via a client device, a request to display a neural network;
   causing display, via the client device in a user interface, of a plurality of layers of the neural network, each of the plurality of layers including nodes;
   causing display, via the client device in the user interface, of connections between the plurality of layers;
   receiving, via the client device via the user interface, a selection by a user of at least one node included in a layer from the plurality of layers;
   activating the selected at least one node based on the user selection by providing data stored within the selected at least one node as input to the neural network;
   propagating, through the neural network, the activation of the selected at least one node based on the data stored within the selected at least one node; and
   causing display, via the client device in the user interface, of results from propagating the activation of the selected at least one node through the neural network.

2. The method of claim 1, further comprising:
   automatically associating an activation level with the at least one node based on the selection;
   causing display of the at least one node in a color that corresponds to the activation level associated with the at least one node.

3. The method of claim 1, further comprising:
   responsive to receiving a user interaction with a node, causing display of information associated with the node.

4. The method of claim 3, wherein the user interaction with the node comprises the user placing a cursor over the node.

5. The method of claim 3, wherein the information associated with the node comprises at least one of the following: an indication of an entity associated with the node, an identifier associated with the node, and an activation level associated with the node.

6. The method of claim 1, wherein for a connection between a first node in a first layer from plurality of layers and a second node in a second layer from the plurality of layers an animation is displayed along the connection based on a value associated with the connection.

7. The method of claim 6, wherein the value associated with the connection is determined based on a weight of the connection.

8. The method of claim 6, wherein the value associated with the connection is determined based on an activation level associated with the first node.

9. The method of claim 6, wherein the animation comprises dots moving along the connection and a color of the dots is based on the value associated with the connection.

10. The method of claim 6, wherein the animation is displayed for a set period of time.

11. The method of claim 6, wherein the animation is displayed after visually indicating an activation level associated with the first node and prior to visually indicating an activation level associated with the second node.

12. The method of claim 1, wherein causing display of results comprises:
   causing display of information associated with a set of nodes of an additional layer from the plurality of layers, the set of nodes having highest activation levels among the plurality of nodes after propagating the activation of the selected node through the neural network.

13. The method of claim 1, wherein the nodes in each of the plurality of layers are displayed in an order determined based on a number of nodes included in the layer.

14. The method of claim 1, further comprising modifying an activation level of the at least one node based on user input, wherein modifying the activation level of the at least one node based on the user input comprises changing the activation level responsive to receiving the user selection.

15. The method of claim 1, further comprising modifying an activation level of the at least one node based on user input, wherein modifying the activation level of the at least one node based on user input comprises:

changing the activation level based on input received via a field displayed for receiving activation levels as input from user for assigning to the node.

16. The method of claim 1, wherein the at least one node selected for modifying an activation level is a node from a layer other than the input layer.

17. The method of claim 1, wherein the at least one node selected for modifying an activation level is a node from a hidden layer.

18. A non-transitory computer readable storage medium comprising computer executable code that when executed by one or more processors causes the one or more processors to perform operations comprising:

receiving, via a client device, a request to display a neural network;
   causing display, via the client device in a user interface, of a plurality of layers of the neural network, each of the plurality of layers including nodes;
   causing display, via the client device in the user interface, connections between the plurality of layers;
   receiving, via the client device via the user interface, a selection by a user of at least one node included in a layer from the plurality of layers;
   activating the selected at least one node based on the user selection by providing data stored within the selected at least one node as input to the neural network;
   propagating, through the neural network, the activation of the selected at least one node based on the data stored within the selected at least one node; and
   causing display, via the client device in the user interface, of results from propagating the activation of the selected at least one node through the neural network.

19. The computer readable storage medium of claim 18, wherein causing display of results comprises:

causing display of information associated with a set of nodes of an additional layer from the plurality of layers, the set of nodes having highest activation levels among the plurality of nodes after propagating the activation of the selected node through the neural network.

20. A computer system comprising:

one or more processors; and a non-transitory computer readable storage medium comprising computer executable code that when executed by the one or more processors causes the one or more processors to perform operations comprising:

receiving, via a client device, a request to display a neural network;
   causing display, via the client device in a user interface, of a plurality of layers of the neural network, each of the plurality of layers including nodes;
   causing display, via the client device in the user interface, connections between the plurality of layers;
   receiving, via the client device via the user interface, a selection by a user of at least one node included in a layer from the plurality of layers;
   activating the selected at least one node based on the user selection by providing data stored within the selected at least one node as input to the neural network;
   propagating, through the neural network, the activation of the selected at least one node based on the data stored within the selected at least one node; and
   causing display, via the client device in the user interface, of results from propagating the activation of the selected at least one node through the neural network.

* * * * *

UNITED STATES PATENT AND TRADEMARK OFFICE
CERTIFICATE OF CORRECTION

PATENT NO. : 11,086,471 B2
APPLICATION NO. : 15/608618
DATED : August 10, 2021
INVENTOR(S) : Greg Thomas Pascale, Zachary Alexander and Scott Thurston Rickard It is certified that error appears in the above-identified patent and that said Letters Patent is hereby corrected as shown below:

In the Claims

Column 12, Claim 1, Line 9: Written as "the selected at least one node; and" should be written as --the selected at least one node to generate activations at a subset of nodes in the second layer that are connected to the at least one node via a subset of the connections, the subset of nodes representing a respective subset of records; and--.

Column 12, Claim 1, Line 11: Written as "interface, of results from propagating" should be written as --interface, the activations at the subset of nodes in the second layer from propagating--.

Column 12, Claim 6, Lines 32-34: Written as "first node in a first layer from plurality of layers and a second node in a second layer from the plurality of layers an animation" should be written as --first node in the at least one node in the first layer and a second node that is a node in the subset of nodes in the second layer or a node in a hidden layer placed between the first layer and the second layer, an animation--.

Column 12, Claim 13, Line 58: Written as "where the nodes in each of the plurality" should be written as --where the nodes in a layer of the plurality--.

Column 13, Claim 18, Line 31 : Written as "the selected at least one node; and" should be written as --the selected at least one node to generate activations at a subset of nodes in the second layer that are connected to the at least one node via a subset of the connections, the subset of nodes representing a respective subset of records; and--.

Column 13, Claim 18, Line 33: Written as "interface, of results from propagating" should be written as --interface, the activations at the subset of nodes in the second layer from propagating--.

Column 14, Claim 20, Line 28: Written as "the selected at least one node; and" should be written as --the selected at least one node to generate activations at a subset of nodes in the second layer that are connected to the at least one node via a subset of the connections, the subset of nodes representing a respective subset of records; and--.

Column 14, Claim 20, Line 30: Written as "interface, of results from propagating" should be written as --interface, the activations at the subset of nodes in the second layer from propagating--.

Signed and Sealed this
Fifteenth Day of August, 2023

*Katherine Kelly Vidal*

Katherine Kelly Vidal
*Director of the United States Patent and Trademark Office*